(12) United States Patent
Suizo et al.

(10) Patent No.: US 10,313,254 B1
(45) Date of Patent: Jun. 4, 2019

(54) NETWORK MANAGEMENT INTERFACE FOR A NETWORK ELEMENT WITH NETWORK-WIDE INFORMATION

(71) Applicant: Extreme Networks, Inc., San Jose, CA (US)

(72) Inventors: Nick G. Suizo, San Jose, CA (US); Ajit Parthan, Sunnyvale, CA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 14/805,362

(22) Filed: Jul. 21, 2015

Related U.S. Application Data

(63) Continuation of application No. 11/731,082, filed on Mar. 30, 2007, now abandoned.

(51) Int. Cl.
  *H04L 12/859* (2013.01)
  *H04L 29/08* (2006.01)

(52) U.S. Cl.
  CPC .......... *H04L 47/2475* (2013.01); *H04L 67/02* (2013.01)

(58) Field of Classification Search
  CPC .. H04L 41/0246; H04L 47/2475; H04L 67/02
  See application file for complete search history.

(56) References Cited

U.S. PATENT DOCUMENTS

| | | | |
|---|---|---|---|
| 6,529,936 B1 | 3/2003 | Mayo et al. | |
| 7,275,104 B1 * | 9/2007 | Martinez | H04L 41/069 |
| | | | 709/218 |
| 7,296,061 B2 | 11/2007 | Martinez et al. | |
| 7,349,980 B1 | 3/2008 | Darugar et al. | |
| 7,672,680 B1 * | 3/2010 | Lee | H04L 67/16 |
| | | | 455/456.1 |
| 7,962,470 B2 * | 6/2011 | Degenkolb | G06F 17/30864 |
| | | | 707/709 |
| 8,145,726 B1 * | 3/2012 | Roche | G06F 11/3688 |
| | | | 709/219 |
| 2002/0099809 A1 * | 7/2002 | Lee | H04L 63/0407 |
| | | | 709/223 |
| 2003/0097464 A1 | 5/2003 | Martinez et al. | |
| 2003/0110242 A1 * | 6/2003 | Brown | H04L 29/06 |
| | | | 709/222 |
| 2003/0222897 A1 * | 12/2003 | Moore | G06F 17/30867 |
| | | | 715/705 |

(Continued)

OTHER PUBLICATIONS

NETGEAR, Wireless Router Setup Manual, Mar. 2006, NETGEAR.*

(Continued)

*Primary Examiner* — Khaled M Kassim
(74) *Attorney, Agent, or Firm* — Sterne, Kessler, Goldstein & Fox P.L.L.C.

(57) ABSTRACT

Methods and apparatuses enable a network of traffic control devices to be viewed as a network of services. A web client sends a query compatible with an open API to a traffic control device. The traffic control device responds to the request by providing the requested service, and indicating an additional, related service that is available externally to the responding traffic control device. Thus, the traffic control device provides network information to the web client, which is traditionally only available via a network management system. The web client can then access the external service.

15 Claims, 4 Drawing Sheets

(56) References Cited

U.S. PATENT DOCUMENTS

| | | | |
|---|---|---|---|
| 2004/0103195 A1* | 5/2004 | Chalasani | H04L 67/1095 709/226 |
| 2004/0139154 A1* | 7/2004 | Schwarze | G06F 17/30884 709/203 |
| 2005/0014520 A1 | 1/2005 | Kimura et al. | |
| 2005/0015491 A1 | 1/2005 | Koeppel | |
| 2005/0021839 A1* | 1/2005 | Russell | H04L 29/06 709/238 |
| 2005/0044197 A1* | 2/2005 | Lai | G06Q 10/10 709/223 |
| 2005/0068571 A1* | 3/2005 | Hart | H04N 1/00281 358/1.15 |
| 2005/0071519 A1* | 3/2005 | Hart | G06K 15/00 710/8 |
| 2005/0071763 A1* | 3/2005 | Hart | G06K 15/00 715/731 |
| 2005/0108288 A1 | 5/2005 | Hartshorne et al. | |
| 2005/0114520 A1* | 5/2005 | White | H04L 63/0209 709/228 |
| 2005/0138065 A1* | 6/2005 | Ciriza | G06Q 10/10 |
| 2005/0256882 A1* | 11/2005 | Able | G06Q 10/10 |
| 2005/0283539 A1* | 12/2005 | Betts | G06F 9/5055 709/245 |
| 2006/0218296 A1 | 9/2006 | Sumner | |
| 2006/0235973 A1 | 10/2006 | McBride et al. | |
| 2006/0277603 A1* | 12/2006 | Kelso | H04L 41/082 726/13 |
| 2007/0011281 A1* | 1/2007 | Jhoney | G06Q 40/04 709/220 |
| 2007/0083618 A1* | 4/2007 | Kim | G06F 9/465 709/218 |
| 2007/0150941 A1* | 6/2007 | Jachner | H04L 67/24 726/5 |
| 2007/0169015 A1* | 7/2007 | Seelig | G06F 11/36 717/136 |
| 2007/0233696 A1* | 10/2007 | Ishihara | G06F 9/54 |
| 2007/0233879 A1* | 10/2007 | Woods | G06Q 30/02 709/227 |
| 2007/0282879 A1* | 12/2007 | Degenkolb | G06F 17/30864 |
| 2007/0294293 A1* | 12/2007 | Rosenbloom | H04L 67/16 |
| 2007/0294395 A1 | 12/2007 | Strub et al. | |
| 2008/0005282 A1* | 1/2008 | Gaedcke | G06F 17/30867 709/219 |
| 2008/0065752 A1 | 3/2008 | Ch'ng et al. | |
| 2008/0086564 A1* | 4/2008 | Putman | H04L 29/06 709/227 |
| 2008/0175222 A1* | 7/2008 | Barnea | H04L 29/12594 370/351 |
| 2008/0178278 A1* | 7/2008 | Grinstein | H04L 63/0227 726/12 |
| 2008/0183902 A1 | 7/2008 | Cooper et al. | |
| 2008/0243631 A1 | 10/2008 | Kane et al. | |
| 2009/0294794 A1 | 12/2009 | Choi | |

OTHER PUBLICATIONS

Non-Final Office Action for U.S. Appl. No. 11/731,082, dated Aug. 20, 2009, 19 pages.

Final Office Action for U.S. Appl. No. 11/731,082, dated Feb. 5, 2010.

Non-Final Office Action for U.S. Appl. No. 11/731,082, dated Oct. 27, 2010, 17 pages.

Final Office Action for U.S. Appl. No. 11/731,082, dated Apr. 14, 2011, 20 pages.

Non-Fnal Office Action for U.S. Appl. No. 11/731,082, dated Mar. 20, 2014, 18 pages.

NETGEAR, "Wireless Router Setup Manual", Mar. 2006, v1.0, NETGEAR.

Final Office Action for U.S. Appl. No. 11/731,082, dated Jan. 21, 2015, 17 pages.

AdventNet Inc., Web NMS, Copyright 1996-2004, AdventNet Inc.; retrieved from http://www.adventnet.com/products/webnms/help/developer_guide/ on Nov. 1, 2006.

* cited by examiner

NETWORK MANAGEMENT INTERFACE FOR A NETWORK ELEMENT WITH NETWORK-WIDE INFORMATION

CROSS-REFERENCE TO RELATED APPLICATIONS

This application is a continuation of U.S. patent application Ser. No. 11/731,082, filed Mar. 30, 2007.

FIELD

Embodiments of the invention relate to network management, and more particularly to a management interface for a network traffic control element with network-wide information.

BACKGROUND

A wired network typically includes several network elements that control the flow of traffic. The network elements are traditionally managed individually via an element management system. Such management relies on the network elements exposing one or more management interfaces used to interact with the element management system. The interfaces may use any of a variety of protocols, including simple network management protocol (SNMP), extensible markup language (XML), common object request broker architecture (CORBA), etc. Traditional element management is limited to management of the features of an individual network element itself; network elements traditionally have only information regarding the individual device, and not information about the network. Thus, communication between network elements has been handled via a centralized network management system. In order to manage a network with previously known techniques, and particularly to diagnose a network problem, each network element must be discovered and individually accessed. Network-wide information was limited to the network management system, which provided network information regarding architecture, configurations, etc.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
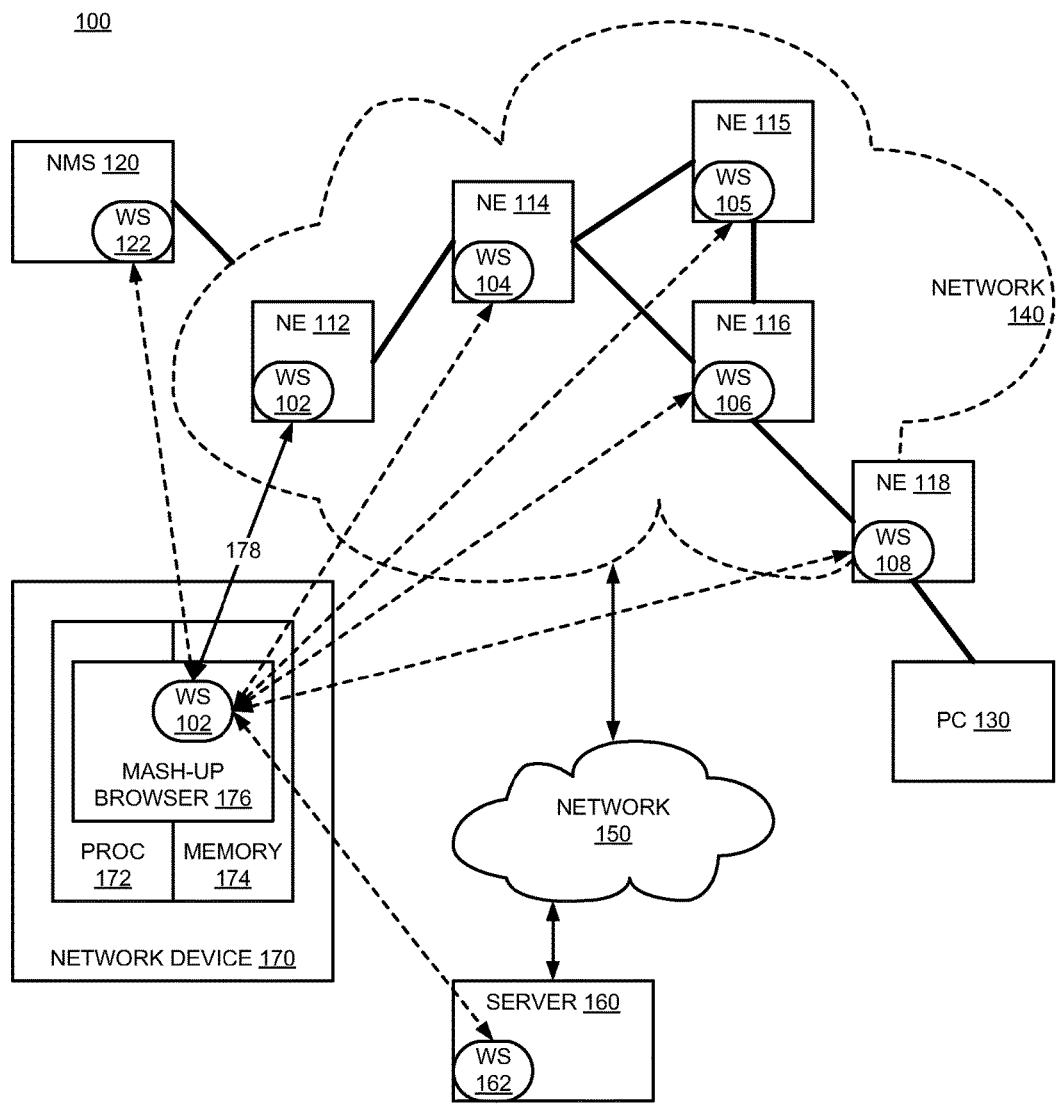
FIG. 1 is a block diagram of an embodiment of a managed network where network elements have an open standards interface and provide network-wide information.

As used herein, references to one or more "embodiments" are to be understood as describing a particular feature, structure, or characteristic included in at least one implementation of the invention. Phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, with an overview description of embodiments of the invention, followed by a more detailed description with reference to the drawings.

A network system includes multiple network traffic control elements, which are referred to herein as "network elements" (NEs). As used herein, an NE refers to a device that performs a traffic control function. Common examples include routers (that performs message/packet forwarding based on decisions made with a (software) protocol stack) and switches (that performs hardware-based message/packet forwarding). Switching is performed in hardware based on information read from a packet to be forwarded. Switching may be performed at any one of a different number of levels (e.g., Layer 2 switching, Layer 3 switching, etc.), where the different layers imply that different information (e.g., headers) is evaluated in making a forwarding decision. Routing is generally considered to be performed in software. For purposes herein, all traffic control elements are considered together, without regard to whether they "switch" or "route" packets. As used herein, a packet refers to a component part of a larger message or signal. A message may be sent one or more packets at a time from a source to a destination.

Traditionally, the network system is viewed as a "network of devices," in which each device is individually controlled and managed. As used herein, "viewing" a network system refers to the mechanisms used to interface with the network system and/or the network devices. Thus, viewing a network system as a network of devices refers to the traditional approach of individually discovering and interfacing with (accessing) the separate NEs of the system. In one embodiment, a network system is viewed as a "network of services," where the services available in a network from different devices can be viewed together. In the "network of services" approach, a request for access to a "service" can reveal information about related services available in the network, whether or not the related services are available from the same NE. Thus, an NE can provide network-wide information in response to a request for a service of the NE. As used herein, a related service or related resource is a service or resource that provides additional services, functions, and/or information related to a requested service. The related resource has an association with the requested service and is, or could be, relevant to the requested service. For example, a related resource could provide additional information that would extend understanding of the requested service. The related resource could give context, or can provide information that is used in conjunction with the requested service in a high percentage of scenarios.

A request is typically generated from a web browser of a device (e.g., a user device) that has access to the network. A web browser refers generally to any application or software component that can access and manage interfaces that allow access to a networked device. The accessed device may be a traffic control element as described, as well as servers or other entities that provide web pages or services. A web browser refers broadly to any component that is able to access and send/receive messages over a network.

The web browser includes an interface agent that enables the web browser to generate a request that is compatible with one or more open application programming interfaces (APIs). The open APIs refer to one or more interfaces that employ one or more of a variety of protocols that have publicly-available components, and/or open standards (e.g., HTTP (hypertext transfer protocol), SOAP (simple object access protocol), SMTP (simple mail transfer protocol), SNMP (simple network transfer protocol), etc.). The web browser generates and sends a request to an identified NE. The NE may be identified, for example, by being known to a user (e.g., the user's network access point), via lookup to a network management system (NMS), or via other mechanisms. The web browser sends the request to an NE that exposes a service to be accessed via the web browser. In one embodiment, the web browser may be considered to be a mash-up browser. The (mash-up) browser can access one or more web clients from network devices and execute them locally to the network device executing the web browser. As used herein, a web client refers generally to any service agent or web page hosted on a device that can be remotely accessed and enable one or more services remotely from the hosting device.

In response to sending the request to the NE, the NE sends back to the web browser information about the service available from the web browser. In one embodiment, the information is sent with a web client hosted on the NE. Additionally, the NE sends information indicating a related resource or a related web service to the web browser. For purposes of description, "related web service" should be understood as being included within the description of a "related resource." Thus, reference to a related resource can be understood as applying as well to a related web service. Some related resources indicated may or may not be understood as being related web services. The related resource is available from external to the NE. Thus, the information indicating the related resource is network-wide information that is available from the NE, in contrast to traditional approaches to the availability and distribution of network information. For example, a web client of the NE may be able to access one or more additional web clients of other NEs that can likewise be accessed in the browser. The web client may have access information and/or network location information to identify another web client or web service.

The related resource essentially allows an "expanded view" of the original service requested of the NE, because the related resource indicates something available outside of the NE that may have some effect or applicability to the requested web service. For example, in response to a request for information regarding a traffic channel on an NE, the NE may return information regarding the traffic channel at the NE (the service available from within the NE), and information about the traffic channel from a neighboring device (the related resource). In response to a request for information regarding firmware associated with a component of the NE, the NE may indicate the revision number (the service available from within the NE), as well indicating that updated firmware exists and providing a download URL (universal resource locator) for the updated firmware (the related resource). A URL or network location for a web service available on the Internet could also be determined or identified and returned in response to the request. As will be appreciated, many other examples are possible.

The web browser can then access the related resource via the information provided by the NE. Note that such an approach may reduce the interaction of the web browser with an NMS. However, in one embodiment, information may be obtained from the NMS, which can be used in conjunction with the information provided by the NE to access the related resource. Note a significant distinction between accessing a single web client under a browser and accessing a web client that enables access to other web clients mashed up in the same browser, via execution of the additional web clients and/or accessing of the services of the additional web clients, as contemplated herein.

At the NE side, the NE includes a web service agent that enables the NE to provide network information regarding a related resource or a web client that enables the web service. Thus, the web service agent allows the NE to provide the "services" view of the network. The web service agent can be implemented in software and/or hardware, as described in more detail below. The web service agent refers to one or more components that expose the NE's services on the network and receive and respond to requests for services. In contrast to what is previously done, the web service agent can enable the NE to provide network topology information, alarms, network device configuration, or other information previously only available from the NMS. In one embodiment, the web service agent hosts a web client that enables one or more web services available from the NE. Additionally, the web client may provide additional network/service information, such as described above.

The NE receives a request for a service available from the NE. As discussed above, the request is compatible with an open API. The NE identifies the service requested that is available from the NE (e.g., the service exposed at an interface). Additionally, the web service agent determines whether an additional, related resource is available in the network. If a related resource is available in the network, the NE can provide that information to the requesting web browser to indicate the related resource to the web browser. As used herein, returning information in response to a request for a service may include providing one or more web clients, values, and/or configurations with regards to a particular component or feature of the NE. Returning the information regarding the service may also include performing a function in response to the request for the service, and returning a result or a data object to the requesting entity.

FIG. 1 is a block diagram of an embodiment of a managed network where network elements have an open standards interface and provide network-wide information. System 100 represents a network system, which may include one or more networks. For example, one or more local area networks (LANs) could be coupled together, and/or a LAN could be coupled with a public network, such as a MAN (metropolitan area network), WAN (wide area network), the Internet, etc.

System 100 includes network 140, which includes NEs 112-118. Each NE 112-118 provides traffic control functions for network 140. Each NE 112-118 includes, respectively, web service agents (WSs) 102-108. WSs 102-108 expose the services of each of the respective NEs 112-118, and enable each NE to provide additional information related to a service available from the NE, assuming a related resource exists. In network 140, NEs 112-116 are generally considered to be completely within the network, while NE 118 is an "edge" device that interfaces a device to the network. PC 130 represents one example of a device coupled to network 140 via NE 118. PC 130 can be a personal computer, as well as any type of workstation, laptop, handheld device, etc.

NMS 120 is a network management system of network 140. In one embodiment, NMS 120 includes WS 122, which can provide network information through web services to network device 170. Network device 170 provides one example of an accessing or requesting device that request and access the services of one or more NE, and may be, for example, a user's local machine that is used to access the network. Network device 170 includes processor (proc) 172 and memory 174, which represent, respectively, one or more processing resources for executing instructions and performing operations and a volatile storage device that stores instructions and/or data for processing. Mash-up browser 176 is executed by processor 172 and is loaded in memory 174 for execution. Additionally, one or more components of browser 176 may be stored within memory 174 for execution by processor 172, for example, a web client. Browser 176 represents a browser that enables network access via one or more network protocols (e.g., hypertext transfer protocol (HTTP), transport control protocol (TCP), Internet protocol (IP)). Browser 176 can be a mash-up browser, meaning that multiple clients can execute simultaneously as a single browser, with the various web services available from the various web clients becoming available. The dashed lines between browser 176 and the various other components of FIG. 1 represent potential connections. Line 178 represents that web service 102 provides a web client hosted on NE 112 to browser 176, which executes under browser 176. Note that any web service agent illustrated that is capable of providing such a hosted web client could provide such a web client to browser 176. Also note that WS 102 as presented in NE 112 represents the web service agent and the web client hosted by NE 112, whereas in one embodiment, it only represents the web client within browser 176. Not all connections are necessarily existent in every configuration, and not all connections are necessarily accessible simultaneously. In one embodiment, browser 176 obtains network information for network 140 via WSs 102-108, 122, and 162. Browser 176 may initiate a connection to a particular NE, for example, NE 112, with a request for a service. In response, NE 112 may indicate a resource available from NE 114 (e.g., indicating WS 104 via a web client), NE 115, NE 116, and/or server 160, in addition to providing the requested service. Any of NEs 114, 115, and 116 may have an additional, related service that is related to the one requested. Additionally, server 160 may provide a related service. Browser 176 can access and mash up all such web clients, which allows a single access to a single NE in network 140 to enable network device 170 to access information about a number of devices in the network.

Network 140 could be coupled to a network 150, which may represent any of the types of network referred to above. Via network 150, a device of network 140 may access server 160, which represents any type of web server, remote file server, online support center, OEM (original equipment manufacturer) website, etc., which may provide a resource related to a service requested of an NE of network 140. Server 160 includes WS 162, which enables server 160 to process and respond to requests from browser 176. In response to receiving an indication of a related resource, browser 176 may access any of one or more indicated related resources.

Figure 2:
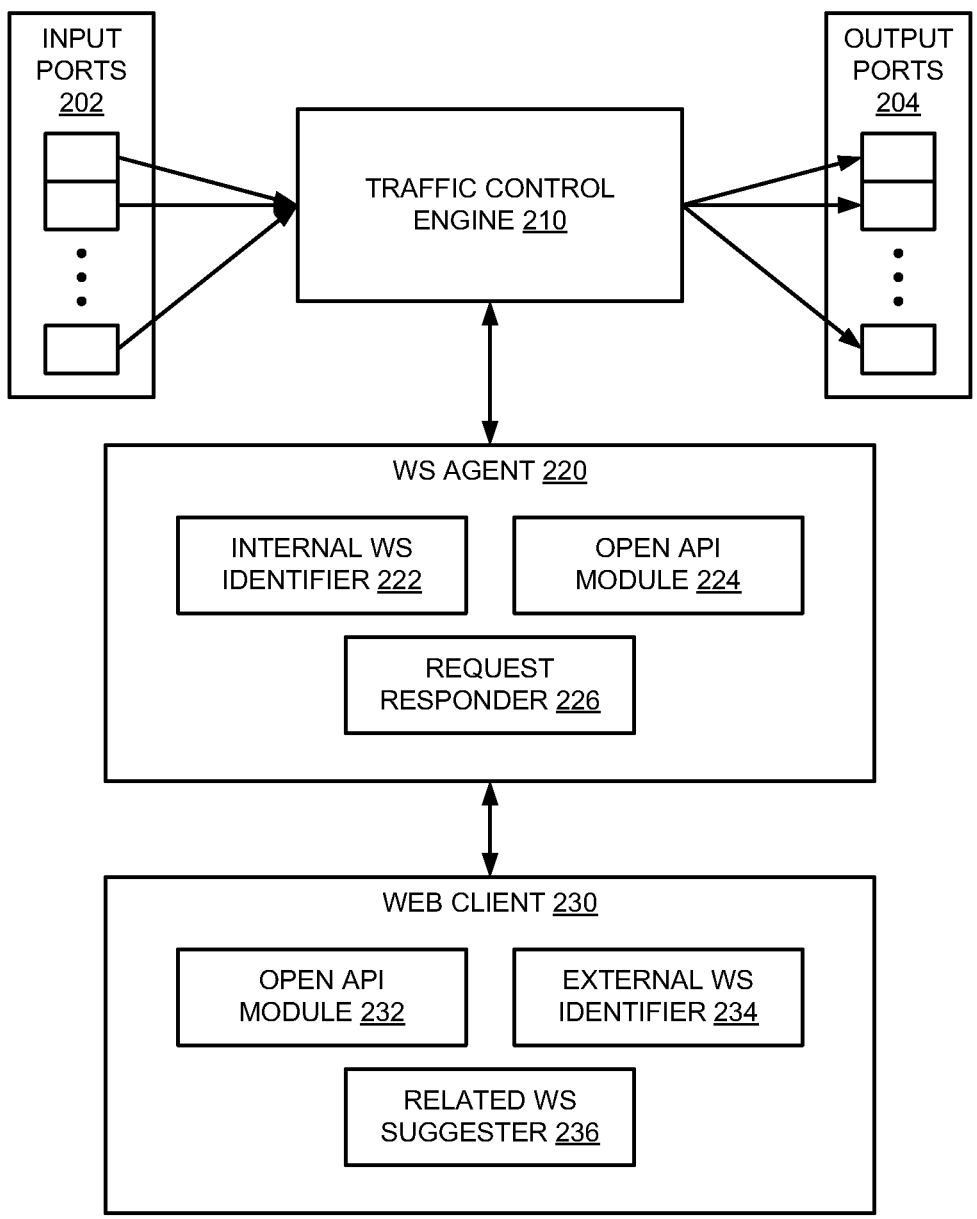
FIG. 2 is a block diagram of an embodiment of a network element having a web service agent.

FIG. 2 is a block diagram of an embodiment of a network element having a web service agent. Network element (NE) 200 includes traffic control engine 210. Traffic control engine 210 provides forwarding functions/operations for NE 200. The forwarding operations, as described above, can be switching or routing. The functionality of forwarding packets or messages is assumed to be understood. NE 200 includes one or more input ports 202, and one or more output ports 204. Traffic is received at an input port 202, and forwarded toward a destination via an output port 204.

NE 200 also includes web service (WS) agent 220. WS agent 220 may also be referred to as an API agent. WS agent 220 may be implemented as hardware and/or software, and provides the web services functionality of NE 200 or provides a web client hosted on NE 200. Certain functions or features of WS agent 220 are represented by various components, which are, or are provided by, one or more means, including internal WS identifier 222, open API module 224, and request responder 226. Each component may further include other components that provide specific functionality. As used herein, a component refers to routine, a subsystem, etc., whether implemented in hardware, software, or some combination. One or more components can be implemented as hardware while other(s) are implemented in software.

Internal WS identifier 222 enables WS agent 220 to identify one or more services available from NE 200 itself. As used herein, "internal service" may be used to refer to services available from NE 200, which is in contrast to an "external service" that is available from outside of, or external to NE 200. Internal service may refer to a service or information available via a web client hosted on NE 200 itself (e.g., web client 230, discussed below). External services may be web clients hosted on other network devices. Internal WS identifier 222 provides the services available from within NE 200. In one embodiment, internal WS identifier 222 exposes the available internal services to the network. Exposing the services allows the services to be viewed in a network of services view by a web browser that accesses NE 200.

API module 224 enables WS agent 220 to receive, process, and respond to requests that are compatible with an open API. As used herein, an interface or a request is compatible with an open API if it complies with or is based on an open API. Modifications to a standards-based protocol can be made without necessarily resulting in being incompatible with the standard. The use of open standards generally provides improved development time and costs. Collaboration and working on device interfacing is generally also improved with open standards. API module 224 operates in a manner compatible with an open API to exchange requests and data with a requestor.

Request responder 226 enables WS agent 220 to provide, in response to a request, a service that is exposed by WS agent 220, for example, by providing a web client hosted on the NE. Just as an open API is employed to generate and send the request, the response to the request should generally follow the open API. Request responder 226 represents a module that gathers data regarding one or more services requested and provides a message with the data. In one embodiment, request responder 226 initiates a function or operation that is to be executed in response to the request to provide the requested service.

NE 200 also includes web client 230. Web client 230 may be implemented as hardware (e.g., a specialized circuits or hardware component) and/or software, and provides web services functionality of NE 200 and network information. Certain functions or features of web client 230 are represented by various components, which are, or are provided by, one or more means, including internal open API module 232, external web service (WS) identifier 234, and related web service (WS) suggester 236. Each component may further include other components that provide specific functionality.

Open API module 232 is similar to open API module 224, and will not be further discussed. External WS identifier 234 enables web client 230 to identify one or more services or web clients external to NE 200. Such related, external services can be identified from a configuration of NE 200. The configuration can occur from initial configuration of the device, and/or through configuration by an NMS to which NE 200 is coupled. The external services may be known through interaction of NE 200 with the other devices from which the external services are available. Interaction may include exchange of data in traffic control operations. All such information and other information can be stored within web client 230, and provided to a browser that accesses web client 230. External WS identifier 228 can determine whether any external services are known.

Related WS suggester 236 enables web client 230 to indicate the related, external services to the requestor in response to a request for services from the NE. Thus, in addition to providing information regarding services available from internal to NE 200, related WS suggester 236 can provide information regarding services available external to NE 200 that may be associated with an internal service, if any. Indicating the external service can enable a requestor to access the service without having to seek out the external service. Related WS suggester 236 can provide related services as part of a message generated by request responder 226, or independently of request responder 226.

The descriptions herein of various components or modules describe components that may include hardware, software, and/or a combination of these. In a case where a component to perform operations described herein includes software, the software data, instructions, and/or configuration may be provided via an article of manufacture by a machine/electronic device/hardware. An article of manufacture may include a machine readable medium having content to provide instructions, data, etc. The content may result in an electronic device as described herein, performing various operations or executions described. A machine readable medium includes any mechanism that provides (i.e., stores and/or transmits) information/content in a form accessible by a machine (e.g., computing device, electronic device, electronic system/subsystem, etc.). For example, a machine readable medium includes recordable/non-recordable media (e.g., read only memory (ROM), random access memory (RAM), magnetic disk storage media, optical storage media, flash memory devices, etc.). The machine readable medium may further include an electronic device having code loaded on a storage that may be executed when the electronic device is in operation. Thus, delivering an electronic device with such code may be understood as providing the article of manufacture with such content described herein. Furthermore, storing code on a database or other memory location and offering the code for download over a communication medium may be understood as providing the article of manufacture with such content described herein.

Figure 3:
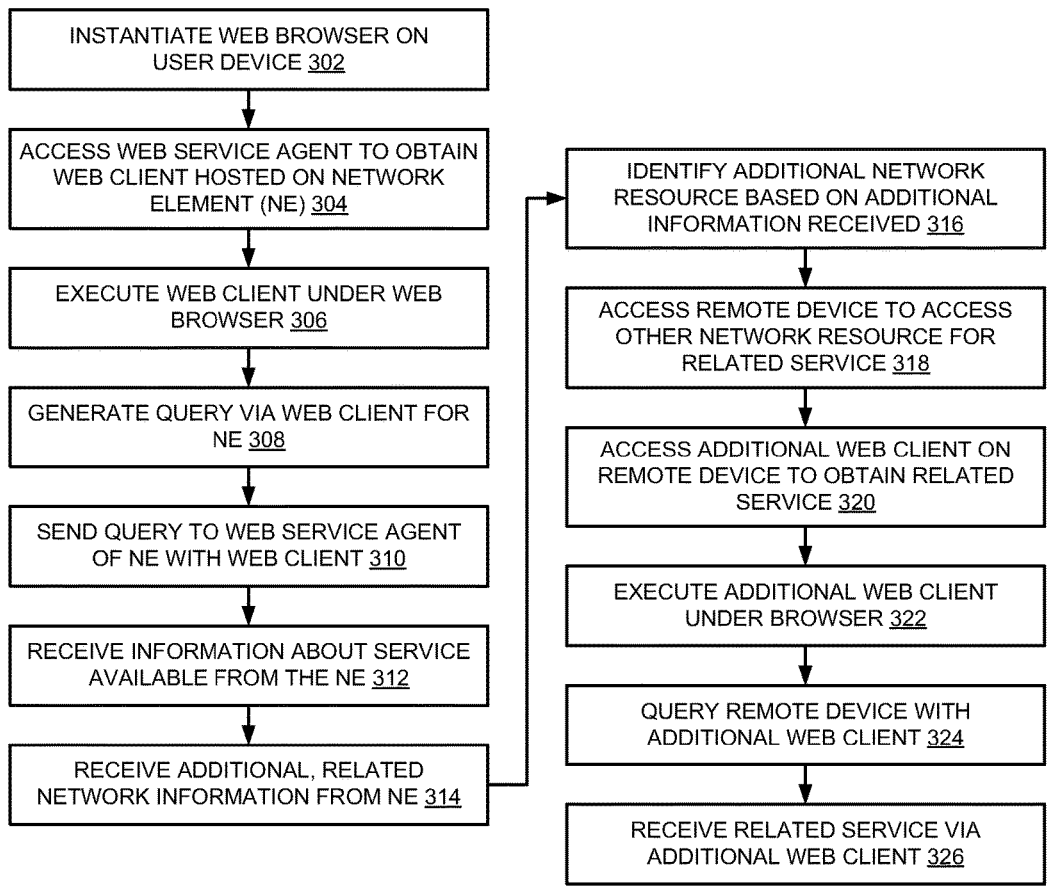
FIG. 3 is a flow diagram of an embodiment of a process for obtaining network information from a network element that has a web service agent.
Figure 4:
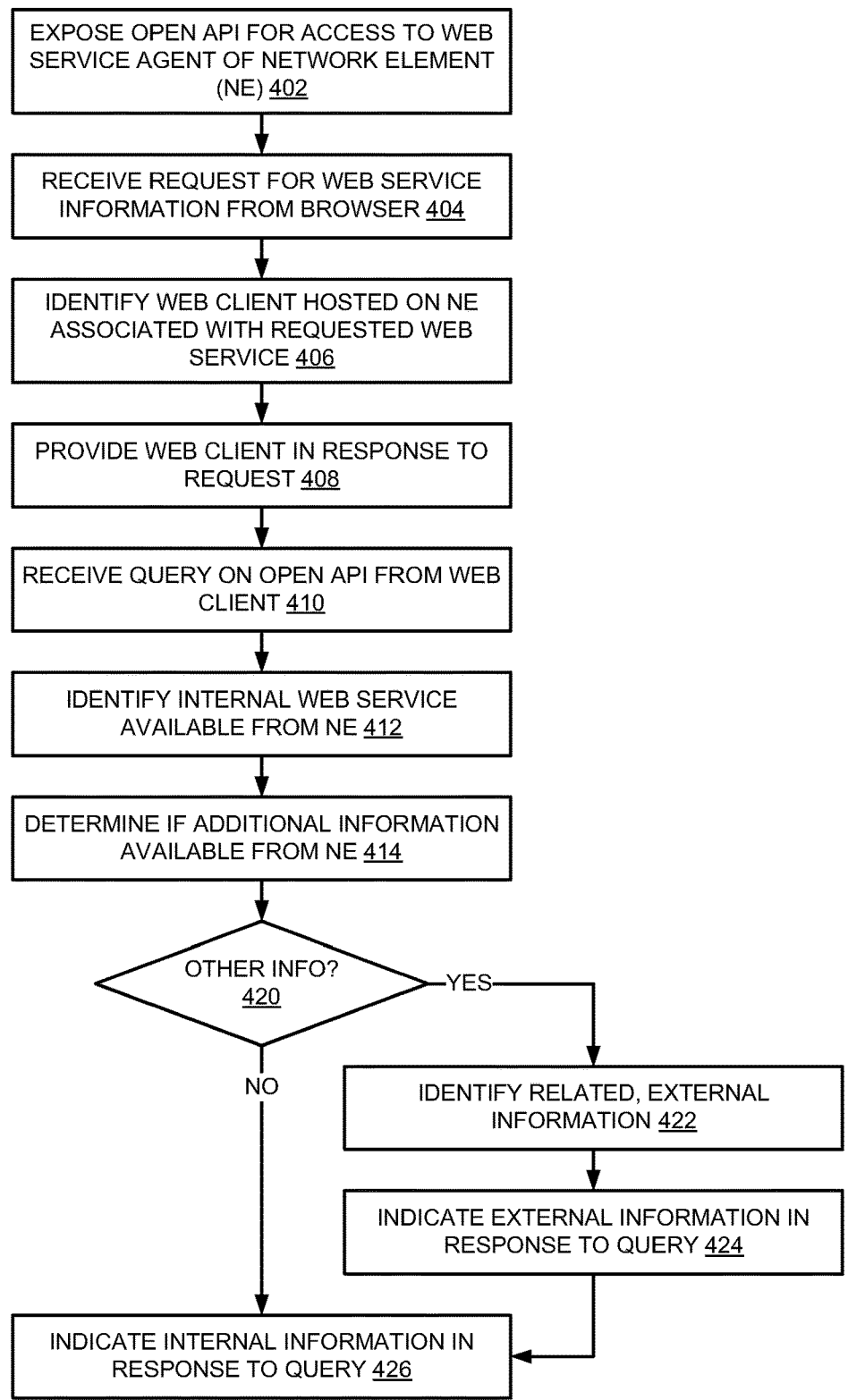
FIG. 4 is a flow diagram of an embodiment of a process for providing network information from a network element in response to a request directed to a network element.

FIGS. 3-4 provide examples of flow diagrams of particular details of embodiments of the invention. The flow diagrams as illustrated herein provide examples of sequences of various operations. Although shown in a particular sequence or order, unless otherwise specified, the order of the operations can be modified. Thus, the illustrated implementations should be understood only as examples, and operations can be performed in a different order, and some operations may be performed in parallel. Additionally, one or more operations can be omitted in various embodiments of the invention; thus, not all operations are required in every implementation.

FIG. 3 is a flow diagram of an embodiment of a process for obtaining network information from a network element that has a web service agent. In one embodiment, a web browser is instantiated on an user device (a device coupled to the network that acts as an accessing machine, through which a user obtains access to the network), 302. When a browser is instantiated, applets, web clients, and other sub-programs or code may be initiated in the web browser. Such components provide functionality to the web browser. Some such components can be accessed remotely from the machine on which the browser is instantiated. Thus, in one embodiment, the web browser accesses a web service agent to obtain a web client hosted on a network element (NE), 304. The web client can then be executed under the web browser, 306. The web browser via the web client may generate a query for a service available from an NE, 308. The service is typically exposed and can be "seen" by accessing the device. The web browser sends the query to a web service agent of the NE that hosts the web client with a request that is compatible with an open API, 310. The web service agent of the NE receives and processes the request. In response to the request, the web service agent sends a message to the web browser indicating information about one or more services available from the NE, 312.

In one embodiment, in addition to receiving information about a service available from the NE, the web service agent provides information about additional, related network information. The web browser receives the related information from the NE, 314. In one embodiment, in response to receiving the network information from the NE, the web client identifies an additional network resource available in the network, 316. The web client is then able to access a remote device to access one or more other network resources for the related service, 318. In one embodiment, the web client accesses an additional web client on the remote device to obtain the related service, 320.

The additional web client can then be executed under the browser, 322. In one embodiment, via the additional web client, the remote device that has the additional, related service is queried for the related service, 324. The browser can then receive the additional related service via the additional web client, 326.

FIG. 4 is a flow diagram of an embodiment of a process for providing network information from a network element in response to a request directed to a network element. A network element (NE) exposes an open API for access to a web service agent of the NE, 402. The NE receives a query on the open API for web service information from a web browser, 404, the query being compatible with the open API. In response to the query, the NE identifies a web client hosted on the NE that is associated with the request web service(s), 406. The NE then provides the web client to the browser in response to the request, 408. The browser then generates a query on an open API from the web client to the NE, which is received at the NE, 410. In response to the query, the NE identifies one or more internal web services available from the NE, 412. In addition to identifying services available from the NE itself, in one embodiment, the NE includes network information that indicates a related network resource available to the requestor on the network. The web service agent of the NE determines if additional information is available from the NE with regards to a related service available externally to the NE, 414.

If other information is available, 420, the web service agent identifies additional, related information about an external resource or service known in the network, 422. The additional, related external information is indicated in response to the query, without requiring a specific query for the related information, 424. The information is merely provided or suggested to the requestor because it is related to an internal service.

If no other information is known to the NE, or after determining that other information is known, the NE indicates the internal information in request to the query, 426. Note that the internal information is provided to the requestor in response to the query, and in some cases external information is also provided. In one embodiment, both internal and external information are provided together. In other embodiments, the information is provided separately. Order of sending the information is not necessarily important in some implementations.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method, comprising:

receiving, at a first network traffic control element and from a network device, a query for a web service of the first network traffic control element;

identifying a web client hosted on the first network traffic control element that provides the web service;

interacting with a second traffic control element via exchange of switching data packets in traffic control operations;

based on the exchanged switching data packets, identifying, an external resource on the second network traffic control element, the external resource providing an additional function used in conjunction with the web service;

providing, to the network device, the web client to enable access to the web service of the first network traffic control element; and indicating the external resource is available on the second network traffic control element to the network device.

2. The method of claim 1, wherein receiving the query comprises receiving a query from a web browser of an access device.

3. The method of claim 1, wherein the external resource comprises a web service provided by a web client hosted on the second network traffic control element.

4. The method of claim 1, wherein the additional function comprises accessing information regarding one or more of a network topology, an alarm, or a network device configuration.

5. A first network traffic control element, comprising:

a network traffic port configured to exchange messages with a network device, wherein the exchange messages comprise a query for a web service available from the first network traffic control element;

a storage device configured to host a web client on the first network traffic control element, wherein the web client is configured to:

provide an internal web service available from the first network traffic control element;

identify an external web service available from a second network traffic control element, wherein the external web service is configured to provide an additional function used in conjunction with the internal web service; and a web service agent communicatively coupled to the network traffic port and configured to:

process the query for the web service available from the first network traffic control element;

interact with the second network traffic control element via exchange of switching data packets in traffic control operations;

based on the exchanged switching data packets, identify the external web service available on the second network traffic control element;

provide the web client to the network device in response to the query; and indicate the external web service is available from the second network traffic control element to the network device.

6. The first network traffic control element of claim 5, wherein the web client comprises an external web service identifier to identify information regarding the second network traffic control element.

7. The first network traffic control element of claim 6, wherein the external web service identifier identifies information about a firmware upgrade for the first network traffic control element and a network location for a download of the firmware upgrade.

8. A method for network management, comprising:

sending a query to a first network traffic control element to access a web client hosted on the first network traffic control element, wherein the query provides web service information for the first network traffic control element;

interacting, between the first network traffic control element and a second network traffic control element, via exchange of switching data packets in traffic control operations;

based on the exchanged switching data packets, identifying an external web service on the second network traffic control element, the external web service providing an additional function used in conjunction with the web service;

receiving access to the web client in response to the query, the web client providing information indicating an internal web service available from the first network traffic control element, and indicating the external web service available from the second network traffic control element; and accessing the external web service in response to receiving the indication from the web client.

9. The method of claim 8, wherein sending the query comprises:

sending a query to a web service agent of the first network traffic control element that interfaces with the web client hosted on the first network traffic control element.

10. The method of claim 8, wherein sending the query comprises sending the query compatible with a hypertext transfer protocol (HTTP) web service protocol.

11. The method of claim 10, wherein sending the query compatible with the HTTP web service protocol comprises sending a query compatible with a simple object access protocol (SOAP).

12. The method of claim 8, wherein receiving access to the web client comprises the web client providing topology information about the second network traffic control element.

13. The method of claim 8, wherein receiving access to the web client comprises the web client providing information indicating a website of a manufacturer of the first network traffic control element.

14. The method of claim 8, further comprising:

accessing network information from a network management system (NMS); and accessing the external web service based at least in part on the network information received from the NMS.

15. The method of claim 14, wherein accessing the network information from the NMS comprises accessing information regarding one or more of the network topology, alarms, or network device configuration.

* * * * *